United States Patent
Mithal et al.

(10) Patent No.: US 10,949,393 B2
(45) Date of Patent: Mar. 16, 2021

(54) OBJECT DELETION IN DISTRIBUTED COMPUTING ENVIRONMENTS

(71) Applicant: International Business Machines Corporation, Armonk, NY (US)

(72) Inventors: Akshat Mithal, Pune (IN); Sandeep R. Patil, Pune (IN); Sasikanth Eda, Vijayawada (IN)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 16/000,227

(22) Filed: Jun. 5, 2018

(65) Prior Publication Data
US 2019/0370351 A1   Dec. 5, 2019

(51) Int. Cl.
| | |
|---|---|
| *G06F 16/00* | (2019.01) |
| *G06F 16/16* | (2019.01) |
| *H04L 29/08* | (2006.01) |
| *G06F 16/13* | (2019.01) |
| *G06F 16/182* | (2019.01) |
| *G06F 16/28* | (2019.01) |

(52) U.S. Cl.
CPC ............ *G06F 16/162* (2019.01); *G06F 16/13* (2019.01); *G06F 16/182* (2019.01); *G06F 16/289* (2019.01); *H04L 67/1097* (2013.01)

(58) Field of Classification Search
CPC ...... G06F 16/162; G06F 16/13; G06F 16/182; G06F 16/289; G06F 8/433; G06F 9/3838; G06F 19/5038
See application file for complete search history.

(56) References Cited

U.S. PATENT DOCUMENTS

| | | | | |
|---|---|---|---|---|
| 5,878,411 A * | 3/1999 | Burroughs | ............ | G06F 16/289 |
| | | | | 717/106 |
| 6,026,413 A * | 2/2000 | Challenger | ......... | G06F 12/0815 |
| | | | | 717/108 |
| 6,076,090 A * | 6/2000 | Burroughs | ............ | G06F 9/4493 |
| | | | | 707/792 |
| 6,085,036 A * | 7/2000 | Bandat | ...................... | G06F 8/71 |
| | | | | 717/120 |
| 7,143,108 B1 * | 11/2006 | George | ................. | G06F 16/284 |
| 7,290,007 B2 * | 10/2007 | Farber | ................. | G06F 16/9024 |
| 7,739,234 B1 * | 6/2010 | Figge | ................... | G06F 16/902 |
| | | | | 707/610 |

(Continued)

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

*Primary Examiner* — Mohammed R Uddin
(74) *Attorney, Agent, or Firm* — Robert J. Shatto (57) ABSTRACT

A microservice executing in a distributed computing system may receive a request to delete a target object stored in the distributed computing system. The microservice may identify dependent objects for the target object using information received in the request. The microservice may generate a new object that includes the data from the target object and the data from the one or more dependent objects. The new object may be stored in the distributed computing system, and the target object may be removed from the distributed computing system.

19 Claims, 9 Drawing Sheets

(56) References Cited

U.S. PATENT DOCUMENTS

| | | | |
|---|---|---|---|
| 7,949,662 B2* | 5/2011 | Farber | G06F 16/164 |
| | | | 707/747 |
| 8,650,156 B1* | 2/2014 | McHugh | G06F 16/219 |
| | | | 707/638 |
| 9,356,962 B2 | 5/2016 | Ilieva et al. | |
| 9,396,202 B1* | 7/2016 | Drobychev | G06F 16/1744 |
| 10,248,336 B1* | 4/2019 | Koujalagi | G06F 11/1438 |
| 2003/0225770 A1* | 12/2003 | Lang | G06F 16/215 |
| 2004/0139097 A1* | 7/2004 | Farber | G06F 16/174 |
| 2005/0192922 A1* | 9/2005 | Edlund | G06F 16/24552 |
| 2009/0150876 A1* | 6/2009 | Krebs | G09B 5/06 |
| | | | 717/165 |
| 2012/0233625 A1* | 9/2012 | Sabin | H04L 41/0803 |
| | | | 718/105 |
| 2012/0311523 A1* | 12/2012 | Venkataraman | G06F 8/71 |
| | | | 717/104 |
| 2013/0304774 A1 | 11/2013 | Tan et al. | |
| 2013/0325810 A1* | 12/2013 | Elder | G06F 16/219 |
| | | | 707/645 |
| 2014/0052700 A1* | 2/2014 | VanderSpek | G06F 16/1756 |
| | | | 707/693 |
| 2014/0258347 A1 | 9/2014 | Laughlin | |
| 2015/0261749 A1* | 9/2015 | Ten-Pow | G06F 16/162 |
| | | | 707/692 |
| 2016/0098418 A1* | 4/2016 | Dakshinamurthy | G06F 16/23 |
| | | | 707/609 |
| 2016/0117226 A1* | 4/2016 | Hetrick | G06F 11/1451 |
| | | | 711/162 |
| 2016/0246802 A1* | 8/2016 | Regni | G06F 16/20 |
| 2017/0004010 A1 | 1/2017 | Ma et al. | |
| 2018/0316551 A1* | 11/2018 | Subramani Nadar | H04L 41/5054 |

* cited by examiner

| Object Name | Grain Pack ID | Grain IDs per Grain Pack | LBAs Packed per Grain |
|---|---|---|---|
| Object-20160101 (generation-0) | 0000 | 0, 1, 4, 6 | 0(000-100), 1(450-550), 4(800-900), 6(1000-1100) |
| Object-20160201 (generation-1) | 0001 | 100, 1, 800, 150 | 100(000-000), 1(450-550), 800(000-000), 150(000-000) |
| Object-20160301 (generation-2) | 0002 | 101, 1, 4, 56 | 101(000-000), 1(450-550), 4(800-900), 56(000-000) |

FIG. 6

| Object Name | Grain IDs | Disk addresses (site-1) | Disk addresses (site-2) | Disk addresses (site-3) |
|---|---|---|---|---|
| Object-20160101 (generation-0) | 0, 1, 4, 6 | 000-010, 800-900, 1000-1200, 1300-1800 | 400-410, 600-800, 900-1000, 1400-1900 | 200-210, 800-900, 1000-1200, 1500-2000 |
| Object-20160201 (generation-1) | 100, 1, 800, 150 | 010-020, 900-1000, 1200-1800, 1400-1900 | 410-420, 800-900, 1000-1200, 1500-2000 | 210-220, 800-900, 1000-1200, 1600-2100 |
| Object-20160301 (generation-2) | 101, 1, 4, 56 | 020-030, 800-900, 1000-1200, 1500-1800 | 420-430, 800-900, 1000-1200, 1600-1900 | 220-230, 800-900, 1000-200, 1700-2000 |

OBJECT DELETION IN DISTRIBUTED COMPUTING ENVIRONMENTS

BACKGROUND

The present disclosure relates generally to the field of computer storage system, and more particularly to performing object deletion using microservices.

Computers store data using various architectures. For example, some computer systems store data using file-level storage, also referred to as file-based storage, using a filesystem. Other computer systems store data as objects in an object storage system. Object storage systems can be operated within a distributed computing environment (e.g., in a cloud-based system) where host devices store their data remotely.

SUMMARY

Embodiments of the present disclosure include a method, system, and computer program product for deleting an object stored in a distributed computing system. A microservice executing in a distributed computing system may receive a request to delete a target object stored in the distributed computing system. The microservice may identify dependent objects for the target object using information received in the request. The microservice may generate a new object that includes the data from the target object and the data from the one or more dependent objects. The new object may be stored in the distributed computing system, and the target object may be removed from the distributed computing system.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of computer storage systems, and more particularly to performing object deletion using microservices within a distributed computing environment. While the present disclosure is not necessarily limited to such applications, various aspects of the disclosure may be appreciated through a discussion of various examples using this context.

Distributed computing systems, such as cloud services, can be used as object storage systems for storing data used by other computing systems. The computer systems (e.g., host devices) may process data and generate objects, which then may be sent over a network to the distributed computing systems for storing. Likewise, the host devices may retrieve the objects stored in the distributed storage system, update the objects, and store new versions of the objects in the distributed storage systems. The new versions may be stored as new generations of the object (e.g., as an object that includes just the changes made from the previous version of the same object). In order to minimize the amount of data taken up by an object, the new generation may only include data for a portion of the object (e.g., data corresponding to what has changed).

When a user (or application) wants to delete a target object that has dependent objects (e.g., a particular generation of a multi-generation object) stored in the cloud, traditionally the user would enter the request using a host device. A storage controller on the host device would then recall all of the objects (e.g., each generation) from the cloud, merge differences between generations where necessary (e.g., to ensure the generation deletion does not delete necessary data for the object), and generate a new object. The new object would then be sent back to the cloud storage system, and the target generation is deleted.

Because the traditional systems require that all generations of the object be sent back to the host device, there are high costs associated with deleting a generation. For example, transmitting multiple generations of an object over the network has high bandwidth and processing costs. Additionally, there may be high memory costs as the data is temporarily stored in buffers awaiting transmission to/from the distributed computing system. Furthermore, by integrating the object deletion and merge operations into the SAN within a cloud-as-a-Tier environment, the number of data GET operations and number of processing operation required to delete a generation may be reduced.

An "object," as used herein, may be a resource for storing data in a computer system that is generated using an object interface (e.g., REST). Unlike files, objects often, though not always, include additional metadata attributes. These metadata attributes may be customizable by users or according to the needs of the object store.

As used herein, an "inode" is a data structure that stores metadata attributes for a file system object (e.g., an object, file, or directory). For example, an inode may be a table that has one or more columns and one or more rows. Each column may correspond to a specific metadata parameter (e.g., object size), and each row may correspond to a specific entry or record in the inode (e.g., to a specific file or object).

While inodes generally refer to the data structure used by UNIX® operating systems to store metadata, other operating systems may have functional equivalents (UNIX is a registered trademark owned by X/OPEN COMPANY LIMITED CORPORATION, UNITED KINGDOM THAMES TOWER, 37-45 STATION ROAD READING, BERKSHIRE RG1 1LX UNITED KINGDOM). Accordingly, the present disclosure should not be limited to UNIX® operating systems. Metadata attributes saved in an inode may include, but are not limited to, directory name, object names, creation times for objects, size, ETag, manipulation metadata (e.g., last access time, last modified time, change time), and owner and permission data (e.g., ACLs, group-id, user-id). Each inode may additionally include disk block location (s) of the file system object's data.

Figure 1:
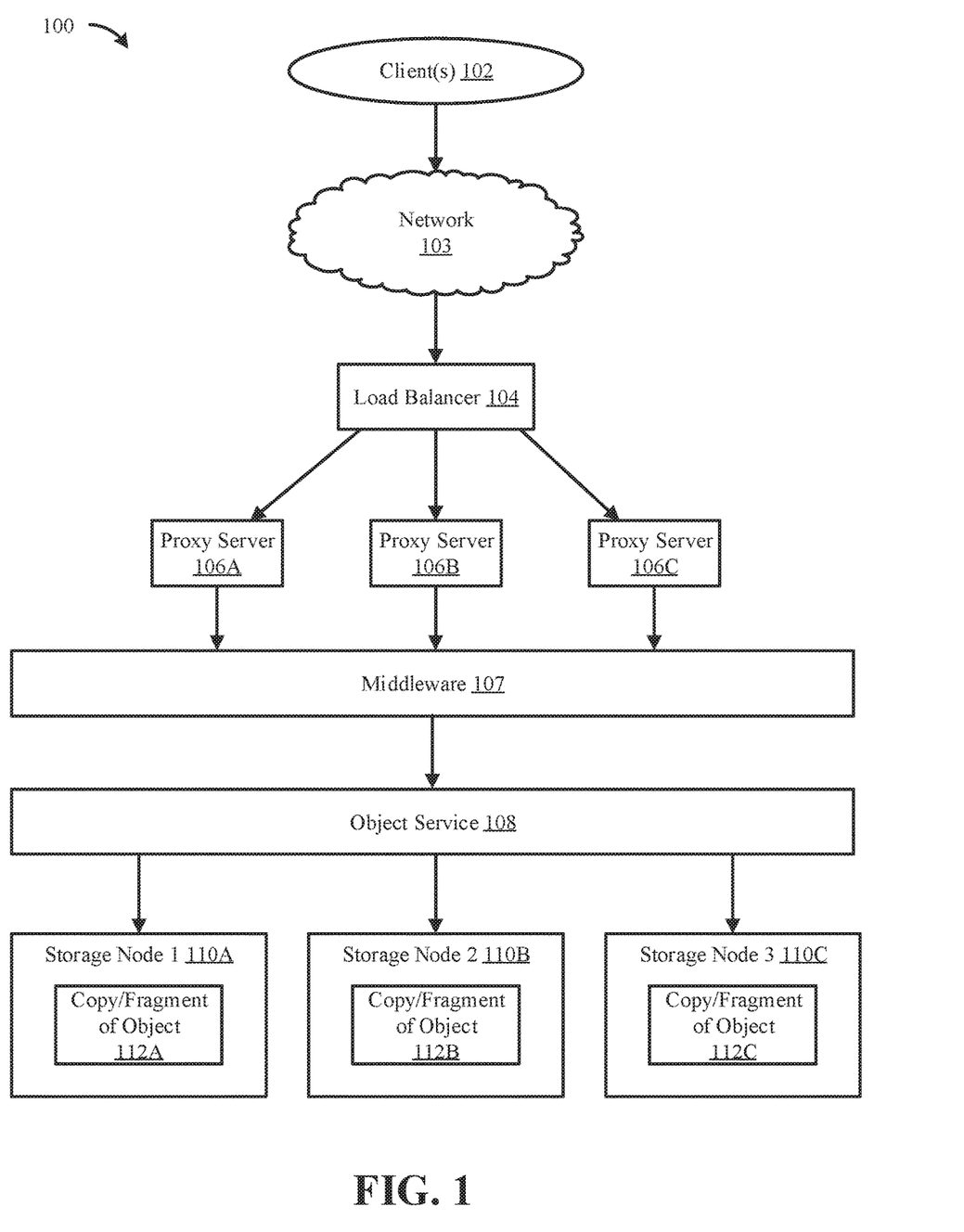
FIG. 1 illustrates an example object storage environment in which illustrative embodiments of the present disclosure may be implemented.

Referring now to FIG. 1, shown is an example object storage environment 100 in which illustrative embodiments of the present disclosure may be implemented. The object storage environment 100 may include one or more clients (e.g., computer systems) 102 that are permitted to access data stored in the using the object service 108 (e.g., using cloud-as-a-backup storage). The clients 102 may send requests (e.g., to retrieve data, update data, store data, etc.) via a network 103 to a load balancer 104, which may be responsible for routing the request through one or more proxy servers 106A-C. The proxy servers 106A-C may be computer systems that perform distributed load handling and request handling for the storage system. The proxy servers 106A-C may pass the requests to the middleware 107 and object service 108.

The middleware 107 and object service 108 may be responsible for determining where data should reside in the object storage. For example, the middleware 107 and object service 108 may route the data storage requests to different zones (e.g., geographical zone) so that different object servers or storage nodes (e.g., storage nodes 110A-110C) handle the requests. The middleware 107 and object service 108 may also be responsible for ensuring that objects are redundantly stored in different zones or regions, and if the object is to be stored using erasure code object storage, may be responsible for determining how the object is to be fragmented and which storage node stores which fragments of the object. This may help ensure that data is protected against location specific outages, and to ensure that backups of all of the objects are kept. Finally, the middleware 107 and object service 108 may be responsible for handling requests to execute a microservice, as discussed in more detail herein.

The storage nodes 110A-C may be computer systems that perform the actual reading/writing of objects from/to the physical hardware (e.g., to HDDs). In a clustered storage system, the storage nodes 110A-C may all write to, and read from, hardware (e.g., SSDs or HDDs) that use a single clustered file system with a single namespace. In some embodiments, the storage nodes 110A-C may be responsible for writing to and reading from a cluster that includes multiple file systems or filesets. These file systems may use different architectures, or they may use the same file system.

Each storage node 110A-C may contain a copy or fragment 112A-C of one or more objects stored in the object storage system. For example, if the object storage system uses a traditional object storage architecture, the storage nodes 110A-C may store full copies of one or more objects. Similarly, if the object storage system utilizes an erasure code object storage architecture, each storage node 110A-C may store fragments (e.g., pieces) of one or more objects.

The object storage environment 100 may also include inodes, which store metadata information for file system objects. As shown in FIG. 1, the various systems in the object storage environment 100 may communicate with each other over one or more networks. For example, the clients 102 may communicate with the load balancer 104 over a network 103. Likewise, the load balancer 104 may communicate with the proxy servers 106A-C over a network, and the proxy servers 106A-C may communicate with the middleware 107 over a network. In some embodiments, the various networks can be implemented using any number of any suitable communications media. For example, the network may be a wide area network (WAN), a local area network (LAN), an internet, or an intranet.

In certain embodiments, the various systems may be local to each other, and communicate via any appropriate local communication medium. For example, the proxy servers 106A-C may communicate with the middleware 107 using a local area network (LAN), one or more hardwire connections, a wireless link or router, or an intranet. In some embodiments, the various systems may be communicatively coupled using a combination of one or more networks and/or one or more local connections. For example, a proxy servers 106A-C may be hardwired (e.g., connected with an Ethernet cable) to the system running the middleware 107, either directly or indirectly, while the clients 102 may communicate with the proxy servers 106A-C using a wireless network (e.g., over the Internet).

Figure 2:
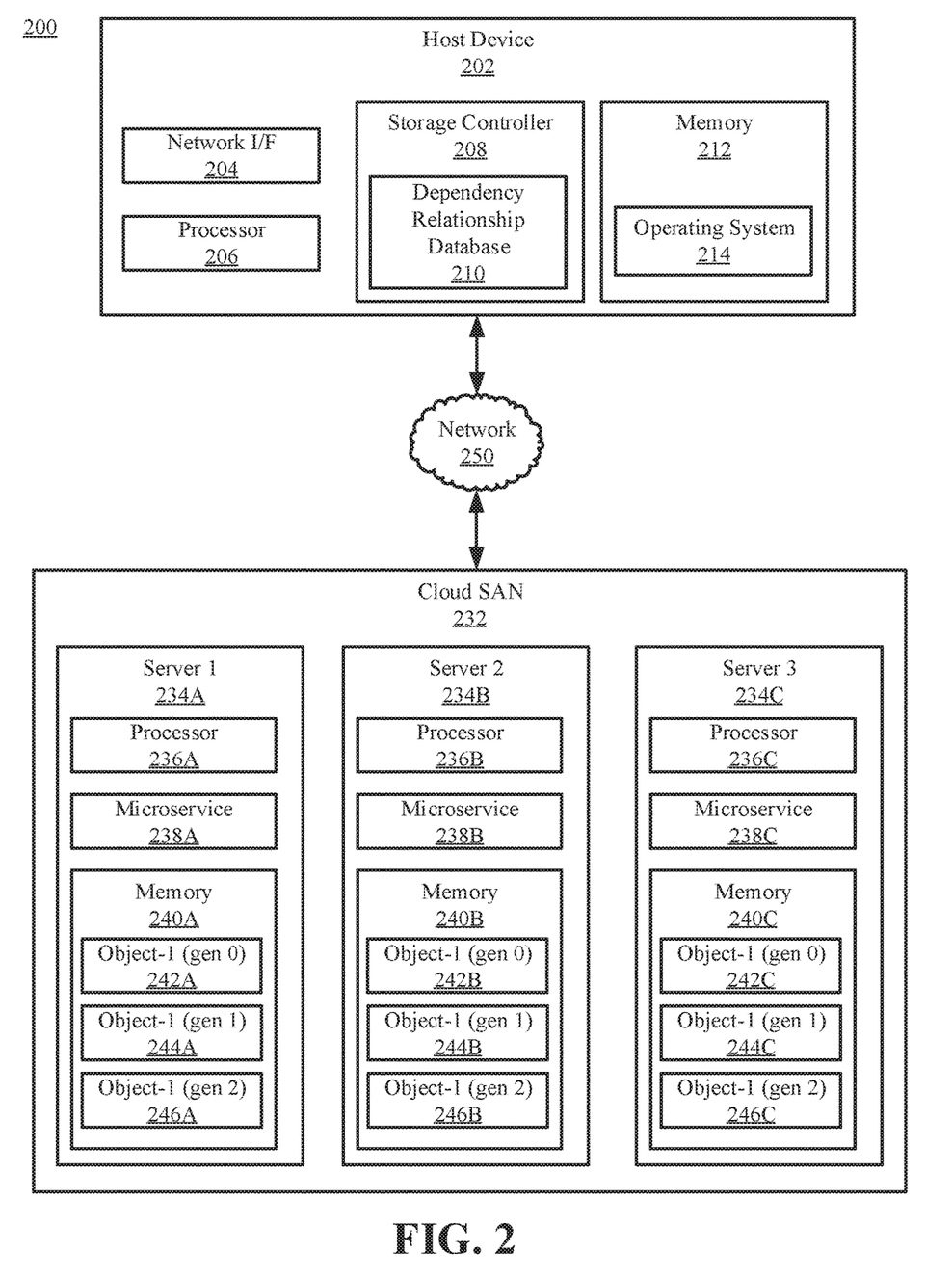
FIG. 2 illustrates an example storage system, in accordance with embodiments of the present disclosure.

Referring now to FIG. 2, illustrated is an example storage system 200, in accordance with embodiments of the present disclosure. The example storage system includes a host device 202, a network 250, and a cloud storage attached network (SAN) 232. The host device 202 may be configured to enable users to send requests to delete one or more generations of an object stored in a distribute computing environment (e.g., in the cloud SAN 232) to the cloud over the network 250. The network 250 may be the same as, or substantially similar to, network 103 described in reference to FIG. 1.

The host device 202 may be a computer system. The host device 202 may include one or more processors 206 and one or more memories 212 storing one or more operating systems 214. The host device 202 may be configured to communicate with the cloud SAN 232 through an internal or external network interface 204. The network interface 204 may be, e.g., modems or network interface cards. The host device 202 may be equipped with a display or monitor. Additionally, the host device 202 may include optional input devices (e.g., a keyboard, mouse, scanner, or other input device), and/or any commercially available or custom software (e.g., browser software, communications software, server software, natural language processing software, search engine and/or web crawling software, filter modules for filtering content based upon predefined parameters, etc.). In some embodiments, host device 202 may be a server, desktop, laptop, or hand-held device such as a smart phone or tablet.

The host device 202 may further include a storage controller 208. The storage controller 208 may be configured to handle storage requests for the host device 202. For example, the storage controller 208 may control access to physical storage (e.g., HDDs) on the host device 202, and may be responsible for reading and writing to the physical storage. Additionally, the storage controller 208 may be configured to process requests to be sent to the cloud SAN 232, and to generate and maintain a dependency relationship table 210 that correlates object names, grain pack IDs, grain IDs, and logical block addresses (LBAs) for one or more objects.

Similarly, the cloud SAN 232 may include one or more servers (e.g., servers 234A-C). The one or more servers 234A-C may be computer systems having one or more processors 236A-C and one or more memories 240A-C. The one or more memories 240A-C may include a copy of one or more objects or object fragments, and each object/fragment may have multiple generations. For example, as shown in FIG. 2, the first memory 240A includes three generations (gen 0, gen 1, and gen 2) 242A, 244A, 246A of an object (Object-1). Likewise, the second memory 240B includes copies of all three generations of the first object 242B, 244B, and 246B, and the third memory 240C includes copies 242C, 244C, and 246C.

Each server 234A-C in the cloud SAN 232 further includes a microservice 238A-C. The microservices 238A-C may be applications/services that are capable of executing code, such as storlets, AWS Lambda, or containers. The microservices 238A-C may be built using an image, and may enable a user to run code inside the object store in a secure and isolated manner (e.g., using a container). Additionally, microservices 238A-C may provide capability to run computations and package data in objects. As described herein, the microservices 238A-C may be configured to receive a request to delete a generation of an object, generate an object mapping table for the object, and perform a delete operation for the generation of the object without the data for the object having to be sent out of the cloud (e.g., to the host device 202).

Figure 3A:
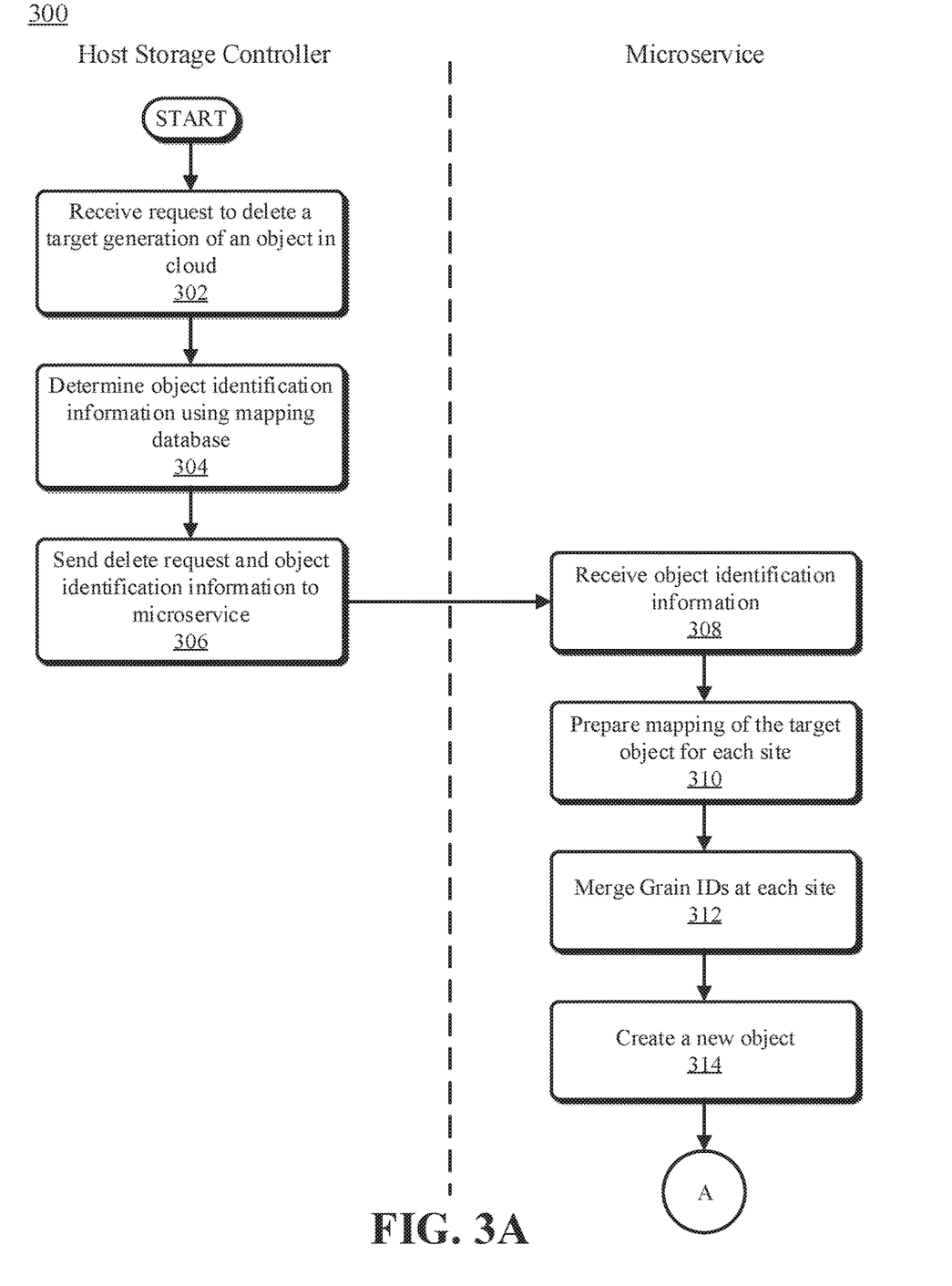
FIGS. 3A and 3B illustrate a flowchart of an example method for deleting a generation of an object stored in a distributed computing system, in accordance with embodiments of the present disclosure.
Figure 3B:
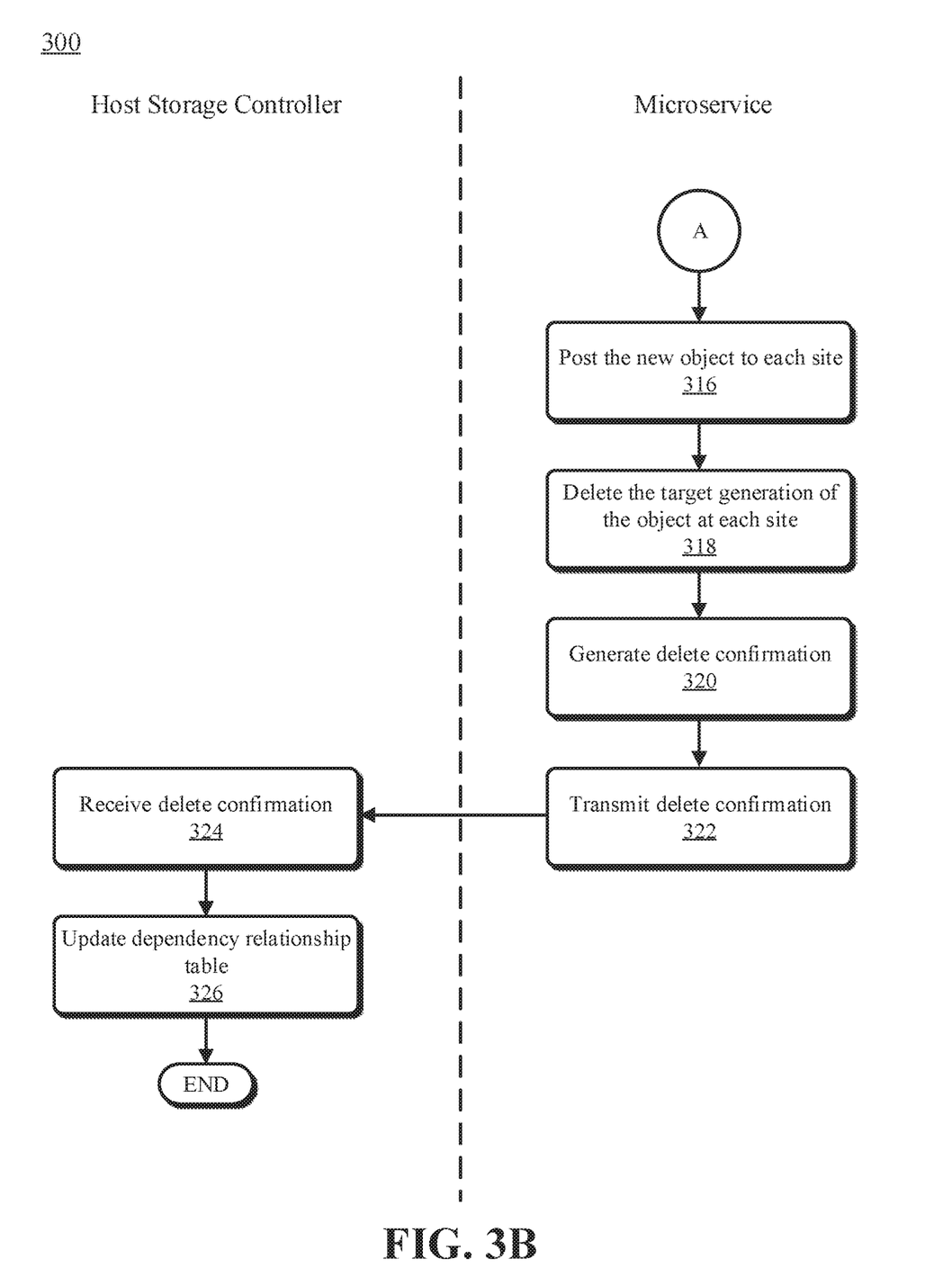

Referring now to FIGS. 3A and 3B, illustrated is a flowchart of an example method 300 for deleting a generation of an object stored in a distributed computing system, in accordance with embodiments of the present disclosure. The method 300 may be a computer implemented method, with one or more of the operations being performed by a processor or storage controller on a host device, and one or more operations being performed by a microservice, server, or SAN controller in the distributed computing system. The method 300 may begin at operation 302, where a host storage controller may receive a request to delete a target generation of an object.

The host storage controller may receive the request from a user. The request may include the name and generation number of the object to be deleted. In some embodiments, the request may be automatically generated by an application instead of manually entered by a user. In some embodiments, the request may include multiple generations and/or multiple objects to be deleted.

Figure 5:
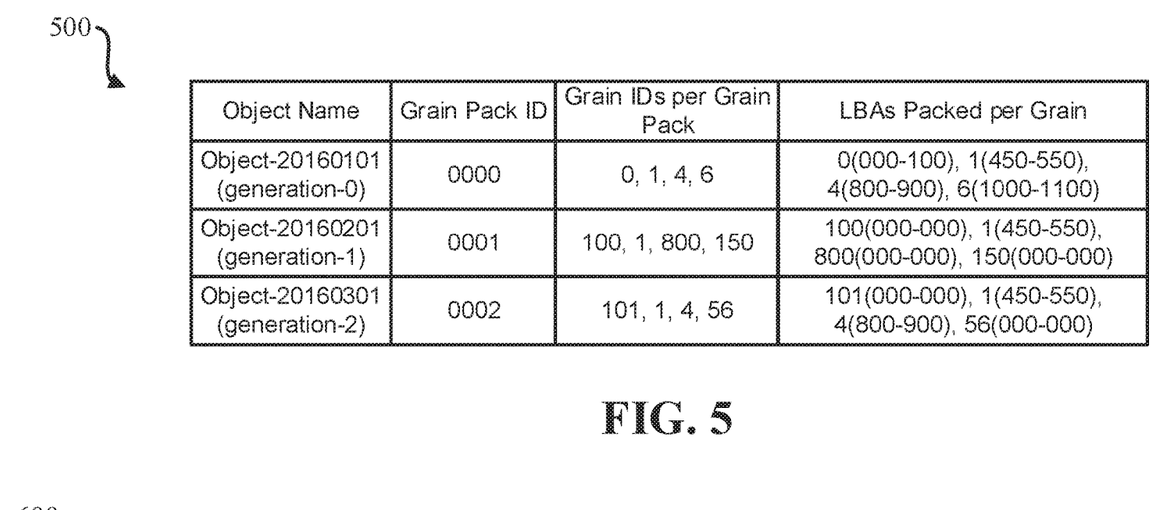
FIG. 5 illustrates an example dependency relationship table stored on a storage controller, in accordance with embodiments of the present disclosure.

After receiving the request to delete the target generation of the object at operation 302, the host storage controller may determine an object ID and object identification information at operation 304. The object identification information may be stored in a mapping database (e.g., a dependency relationship table). The object identification information may include an ID for the target generation, as well as IDs for dependent generations (e.g., generations that follow the target generation). In some embodiments, the host storage controller may identify the generations using object metadata in addition to, or instead of, the dependency relationship table. In other embodiments, the object metadata may be used to generate and maintain the dependency relationship table. An example dependency relationship table is shown in FIG. 5. Each object generated by the storage controller may be associated with metadata that includes the snapshot creation date, a timestamp, dependency information, grain size, and grain IDs. As used herein, a grain is a generic term that describes a group of LBAs that are packed together, and a grain ID is the index of a particular grain. This information may be stored and maintained by the host storage controller (e.g., stored directly on the controller or in memory that is communicatively coupled to the host storage controller).

After determining the object identification information at operation 304, the host storage controller may transmit the delete request and object identification information to a microservice at operation 306, which may receive the information at operation 308. The transmitted information may include the grain size and object names for the target object and dependent objects. The microservice may be, for example, a storlet running inside a SAN device in a distributed computing environment.

Figure 6:
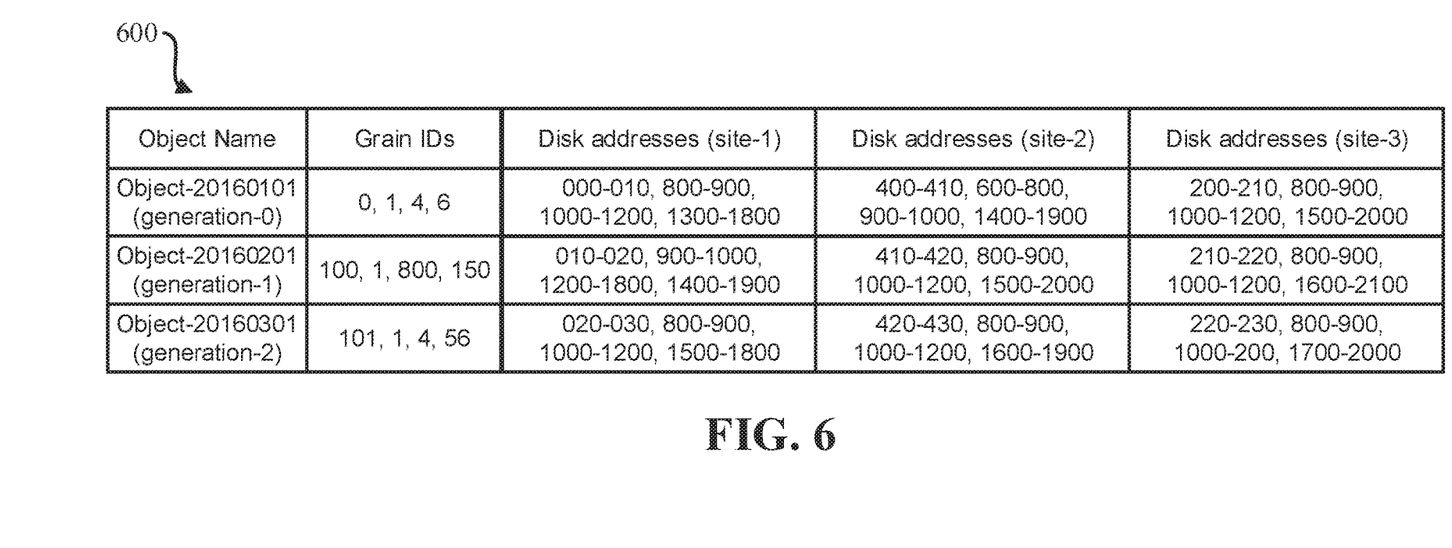
FIG. 6 illustrates an example object mapping table, in accordance with embodiments of the present disclosure.

After receiving the object identification information at operation 308, the microservice may generate an object mapping table at operation 310. The microservice may be build using an image which contains code for extracting disk addresses/block ranges for the provided objects, which may be replicated across different sites. The microservice may use the direct and/or indirect blocks field of the object inodes to extract the disk addresses. The object mapping table may be a temporary table stored in the cloud during execution of the delete request. An example object mapping table is shown in FIG. 6.

After generating the object mapping table at operation 310, the microservice may merge grain IDs at each site at operation 312, as required, and create a new object at operation 314. This is illustrated in more detail in FIG. 4. With reference now to FIG. 3B, after generating the new object at operation 316, the microservice may post the new object to each site at operation 316 and delete the target generation at each site at operation 318. The microservice may then create a delete confirmation and transmit the delete confirmation to the host device at operations 320 and 322, respectively. Upon receiving the delete confirmation at operation 324, the host storage controller may update the dependency relationship table to reflect the creation of the new object and the deletion of the target generation at operation 326.

As discussed in more detail herein, it is contemplated that some or all of the operations of some of the embodiments of methods described herein may be performed in alternative orders or may not be performed at all; furthermore, multiple operations may occur at the same time or as an internal part of a larger process. Additionally, one or more operations described herein may be performed by a different component.

Figure 4:
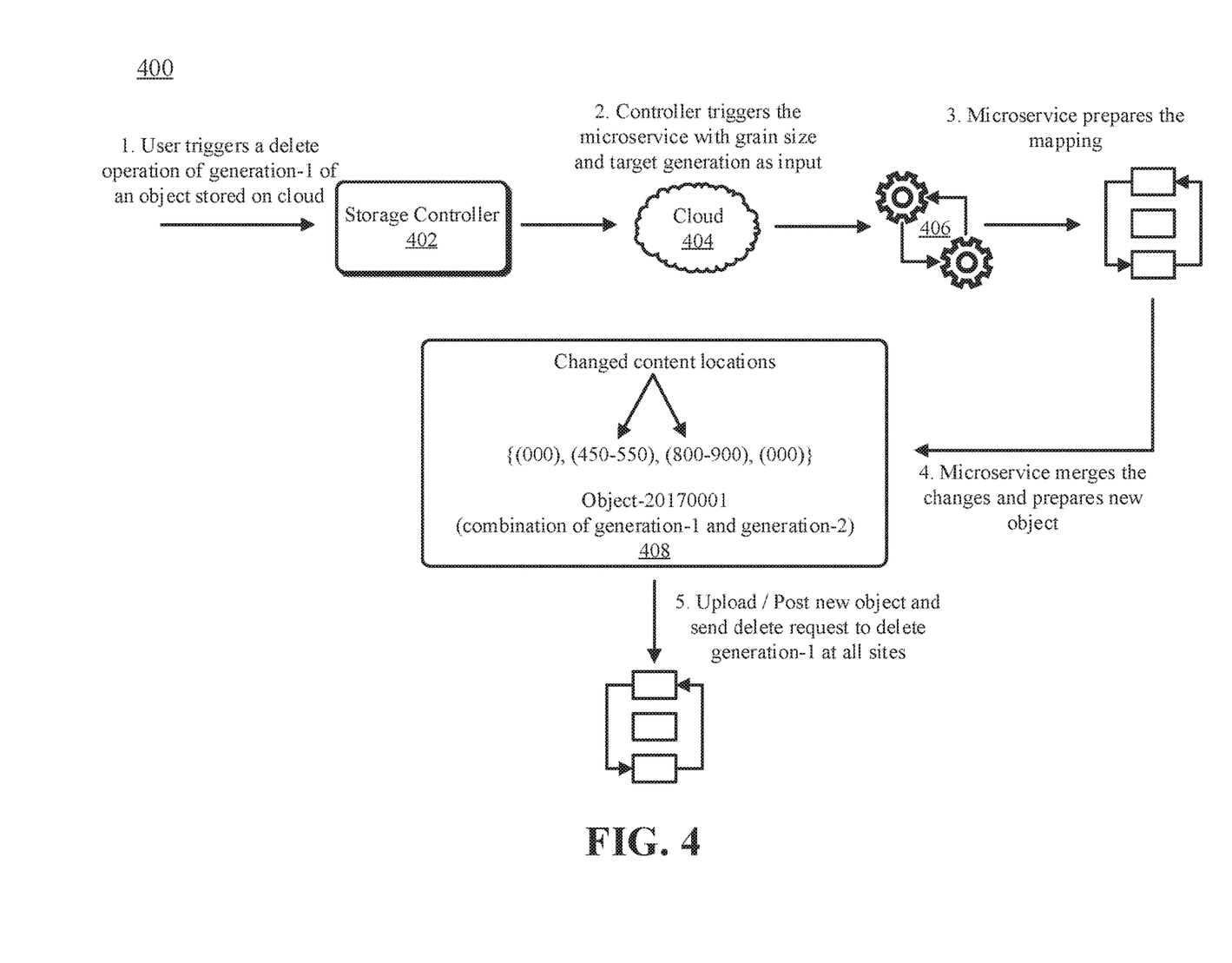
FIG. 4 illustrates a block diagram of an example process for deleting a generation of an object, in accordance with embodiments of the present disclosure.

An example implementation of various embodiments will now be discussed with reference to FIGS. 4-6. FIG. 4 illustrates is a functional diagram of an illustrative example process 400 for deleting a target generation (e.g., generation-1) of an object, in accordance with embodiments of the present disclosure. As shown, a storage controller 402 receives a request from a user to delete generation-1 of an object (step 1). The storage controller 402 processes the request using the dependency relationship table 500 (shown in FIG. 5) and creation timestamps for the generations to determine the object name for the target generation (Object- 20160201), the object name for all its dependencies (Object-2016-0301), and the grain size(s).

The dependency relationship table 500 may be stored in, and maintained by, the storage controller 402. The dependency relationship table 500 may include information about each generation of an object. For example, the dependency relationship table 500 includes information pertaining to three generations of a single object. Each generation includes an object name, a grain pack ID, individual grain IDs for each grain pack, and logical block addresses (LBAs) for each grain. Sparse vectors (e.g., "(000-00)" in the LBAs column in FIG. 5 indicate that no changes were made to that particular grain by the generation. For example, looking at generation-1 (Object-20160201), no changes were made at grain ID 100, so the entry for grain ID 100 in the LBA column is "100 (000-00)." When changes are made, such as to grain ID 1 in generation-1, the LBAs of the changes are includes (e.g., "1 (450-550)" in FIG. 5).

The storage controller 402 then passes the object names, grain IDs, and grain size(s) (e.g., the count of LBAs in a particular grain) to a microservice 406 executing in a cloud computing environment 404 (step 2). Upon receipt of the object names, the microservice 406 prepares an object mapping table 600 (shown in FIG. 6) using the received information (step 3). The object mapping table 600 prepared by the microservice 406 includes entries for each object generation (or, in some embodiments, just the target generation and its dependent generation). Each entry may include the grain IDs for the generation, as well as the physical disk addresses for each site that the generation is stored at. The disk addresses may be extracted by the microservice 406 from the grain IDs. In the illustrative embodiment in FIG. 6, each generation is stored at three different sites, however in other embodiments each generation may be stored at more or fewer sites, and different generations may be stored at different sites. The microservice 406 may use a LBA-to-disk address mapping (not shown) to convert the grain IDs/LBAs received from the storage controller 402 into physically disk address.

Using the object mapping table 600, the microservice may then identify changes made by the target generation and its dependent generation(s), merge the generations, and prepare a new object 408 (step 4). In the example in FIG. 4, the target generation (generation-1) includes a single dependent generation (generation-2). Using the received information (e.g., as shown in the relationship table 500), the microservice 406 determines that generation-1 made changes to LBAs 450-550, and generation-2 made changes to LBAs 450-550 and 800-900. Accordingly, the microservice 406 generations the new object 408 by merging the changes to LBAs 450-550, keeping the changes made to LBAs 800-900. The microservice 406 then posts the new object to all sites and deletes generation-1 and generation-2 (the contents of which having been merged into the new object) from the sites (step 5) and the process 400 ends.

It is to be understood that the dependency relationship table 500 and the object mapping table 600 are provided for illustrative purposes, and should not be construed as limiting. In some embodiments, the dependency relationship table 500 and the object mapping table 600 may include additional fields. For example, the dependency relationship table 500 and/or the object mapping table 600 may include a timestamp field for each generation. In other embodiments, the dependency relationship table 500 and the object mapping table 600 may include fewer fields. Additionally, the dependency relationship table 500 and the object mapping table 600 may be stored in different forms, or not at all.

Figure 7:
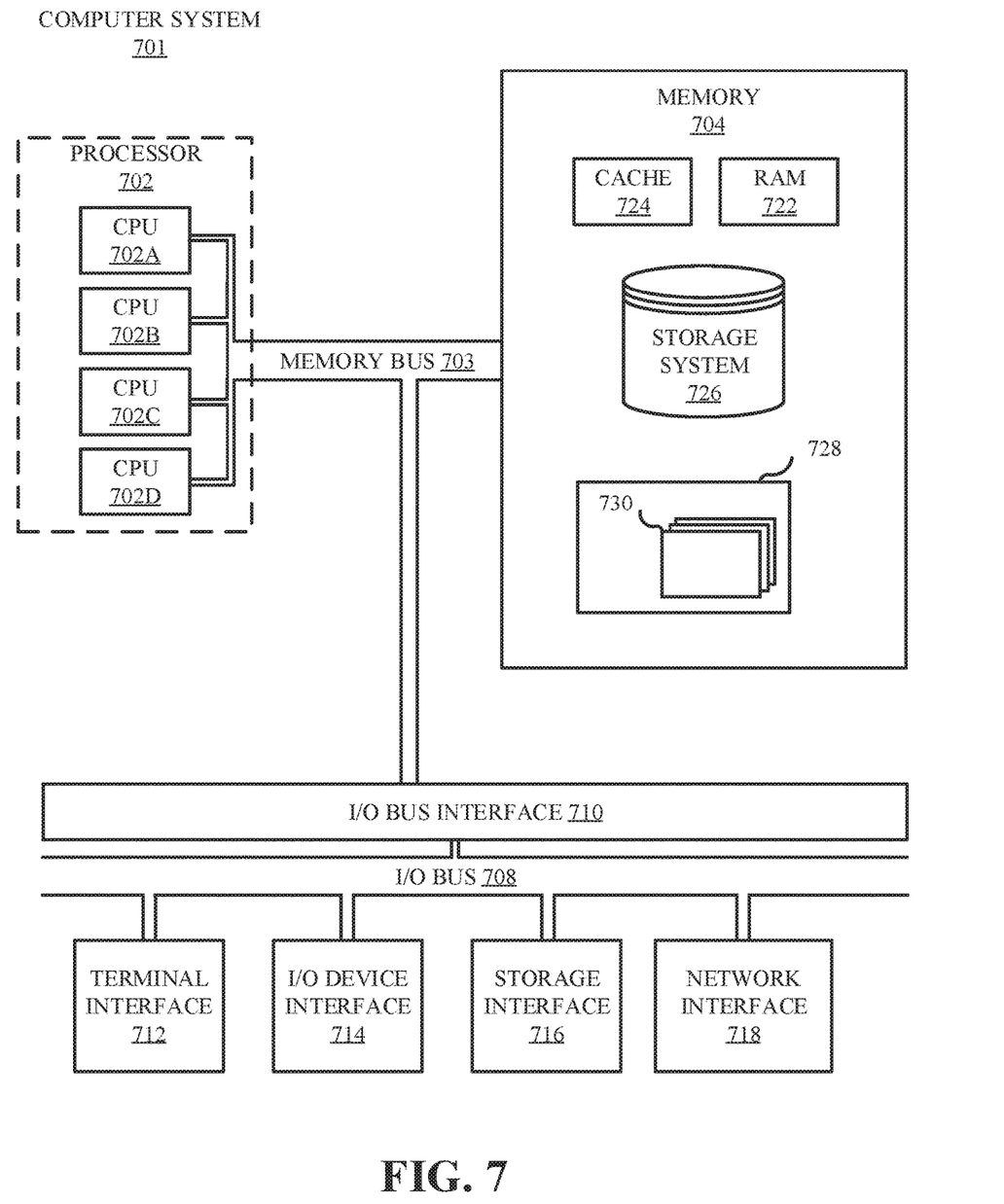
FIG. 7 illustrates a high-level block diagram of an example computer system that may be used in implementing one or more of the methods, tools, and modules, and any related functions, described herein, in accordance with embodiments of the present disclosure.

Referring now to FIG. 7, shown is a high-level block diagram of an example computer system 701 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 701 may comprise one or more CPUs 702, a memory subsystem 704, a terminal interface 712, a storage interface 716, an I/O (Input/Output) device interface 714, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may include one or more levels of on-board cache.

System memory 704 may include computer system readable media in the form of volatile memory, such as random access memory (RAM) 722 or cache memory 724. Computer system 701 may further include other removable/non-removable, volatile/non-volatile computer system storage media. By way of example only, storage system 726 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 704 can include flash memory, e.g., a flash memory stick drive or a flash drive. Memory devices can be connected to memory bus 703 by one or more data media interfaces. The memory 704 may include at least one program product having a set (e.g., at least one) of program modules that are configured to carry out the functions of various embodiments.

One or more programs/utilities 728, each having at least one set of program modules 730 may be stored in memory 704. The programs/utilities 728 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 730 generally perform the functions or methodologies of various embodiments.

Although the memory bus 703 is shown in FIG. 7 as a single bus structure providing a direct communication path among the CPUs 702, the memory subsystem 704, and the I/O bus interface 710, the memory bus 703 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
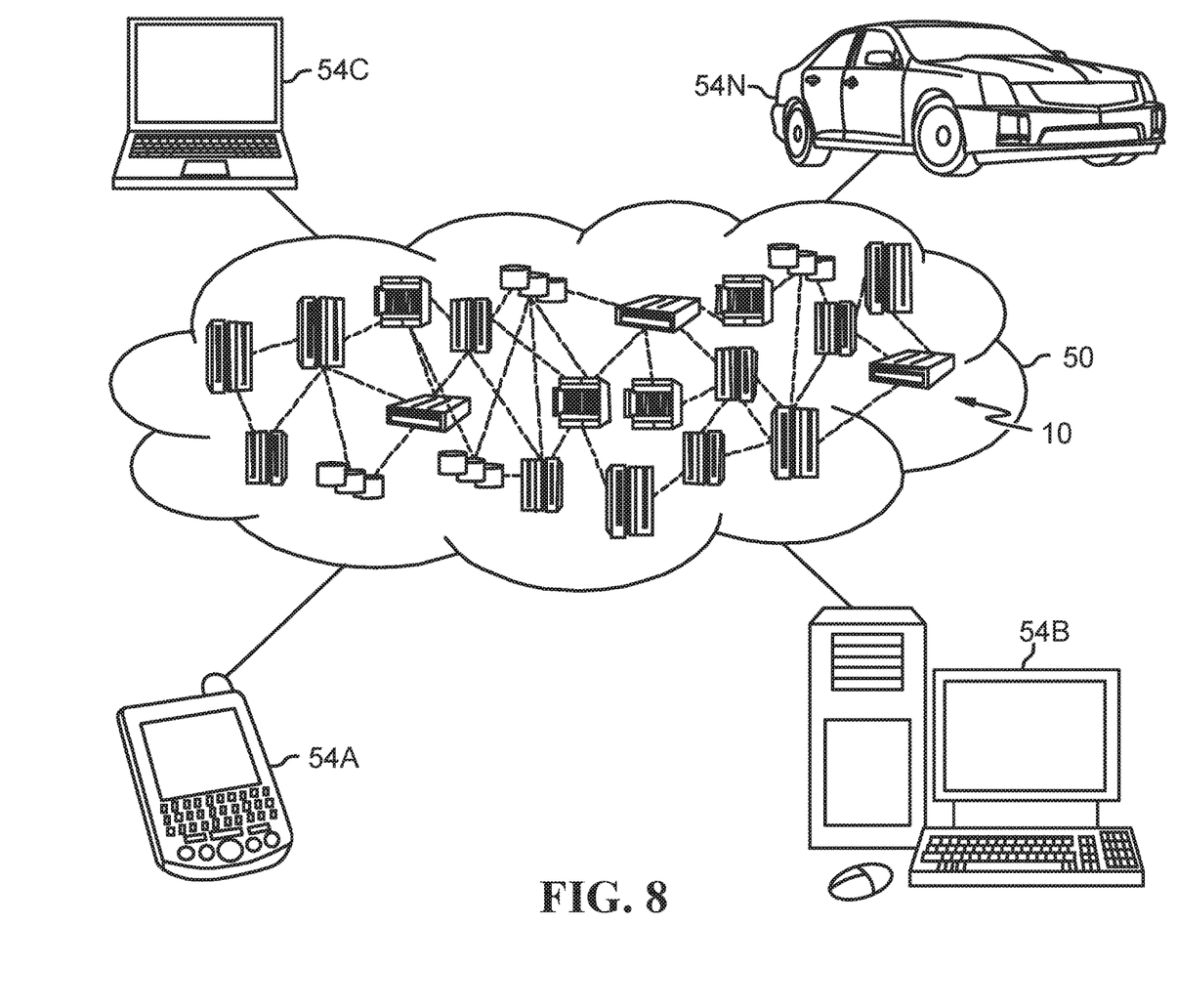
FIG. 8 depicts a cloud computing environment, in accordance with embodiments of the present disclosure.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
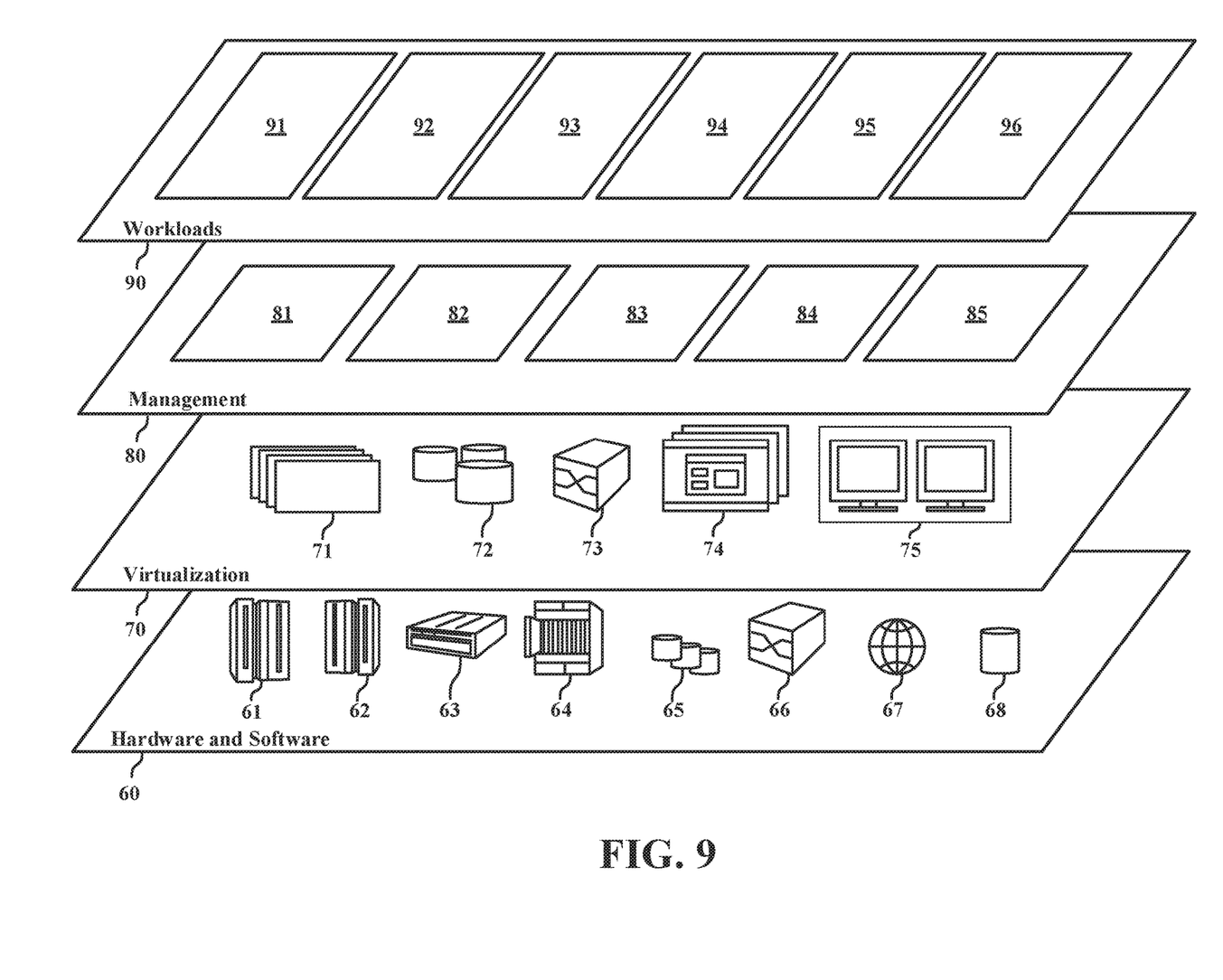
FIG. 9 depicts abstraction model layers, in accordance with embodiments of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding of the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to those skilled in the art. Therefore, it is intended that the following claims be interpreted as covering all such alterations and modifications as fall within the true spirit and scope of the invention.

What is claimed is:

1. A computer-implemented method for deleting an object stored in a distributed computing system, the method comprising:

receiving, by a microservice executing in a distributed computing system that is in a cloud computing environment, from a storage controller, a request to delete a target object stored in the distributed computing system, wherein the target object is a particular generation of an object stored in a storage attached network (SAN) in the distributed computing system as multiple generations, and wherein the microservice is executing within the SAN;

identifying, by the microservice, one or more dependent objects for the target object using information received in the request;

generating, by the microservice, a new object that includes the data from the target object and the one or more dependent objects;

storing the new object in the distributed computing system; and deleting the target object from the distributed computing system.

2. The method of claim 1, wherein the information received in the request includes a first object name for the target object, a second target name for a dependent object, and grain IDs for each of the target object and the dependent object.

3. The method of claim 2, wherein the method further comprises:

generating, by the microservice, and object mapping table for the target object, wherein the object mapping table includes disk addresses for the target object and for the dependent object at two or more locations in the distributed computing system.

4. The method of claim 2, wherein generating the new object includes:

identifying a first set of logical block addresses (LBAs) for the target object, the first set of LBAs indicating locations of changes made by the target object to a particular object;

identifying a second set of LBAs for the dependent object, the second set of LBAs indicating locations of changes made to the particular object by the dependent object; and merging the changes made by the target object and by the dependent object using the first and second sets of LBAs.

5. The method of claim 1, wherein the information received in the request includes a dependency relationship table, the dependency relationship table including an object name for the target object and for each of the one or more dependent objects, grain IDs for each of the target object and the one or more dependent objects, and a set of LBAs for each of the target object and the one or more dependent objects, wherein the set of LBAs for a respective object include LBAs associated with changes made by the respective object.

6. The method of claim 1, wherein identifying the one or more dependent objects for the target object includes:

comparing timestamps and object names for a plurality of objects stored in the distributed computing system; and determining, based on the comparing, that at least one object is a dependent object of the target object.

7. The method of claim 1, wherein each respective generation of the object includes only data that has changed relative to the generation that immediately precedes the respective generation.

8. A system in a distributed computing environment comprising:

a memory; and a processor communicatively coupled to the memory, wherein the processor is configured to perform a method comprising:

receiving, by a microservice executing in a distributed computing environment that is in a cloud computing environment, from a storage controller, a request to delete a target object stored in the distributed computing system, wherein the target object is a particular generation of an object stored in a storage attached network (SAN) in the distributed computing system as multiple generations;

identifying, by the microservice, one or more dependent objects for the target object using information received in the request;

generating, by the microservice, a new object that includes the data from the target object and the one or more dependent objects;

storing the new object in the distributed computing environment; and deleting the target object from the distributed computing environment.

9. The system of claim 8, wherein the microservice is executing within the SAN.

10. The system of claim 8, wherein the information received in the request includes a first object name for the target object, a second target name for a dependent object, and grain IDs for each of the target object and the dependent object.

11. The system of claim 10, wherein the method performed by the processor further comprises:

generating, by the microservice, and object mapping table for the target object, wherein the object mapping table includes disk addresses for the target object and for the dependent object.

12. The system of claim 10, wherein generating the new object includes:

identifying a first set of logical block addresses (LBAs) for the target object, the first set of LBAs indicating locations of changes made by the target object to a particular object;

identifying a second set of LBAs for the dependent object, the second set of LBAs indicating locations of changes made to the particular object by the dependent object; and merging the changes made by the target object and by the dependent object using the first and second sets of LBAs.

13. The system of claim 8, wherein the information received in the request includes a dependency relationship table, the dependency relationship table including an object name for the target object and for each of the one or more dependent objects, grain IDs for each of the target object and the one or more dependent objects, and a set of LBAs for each of the target object and the one or more dependent objects, wherein the set of LBAs for a respective object include LBAs associated with changes made by the respective object.

14. The system of claim 8, wherein identifying the one or more dependent objects for the target object includes:

comparing timestamps and object names for a plurality of objects stored in the system; and determining, based on the comparing, that at least one object is a dependent object of the target object.

15. A computer program product comprising a computer readable storage medium having program instructions embodied therewith, the program instructions executable by a processor to cause the processor to perform a method comprising:

receiving, by a microservice executing in a distributed computing system that is in a cloud computing environment, from a storage controller, a request to delete a target object stored in the distributed computing system wherein the target object is a particular generation of an object stored in the distributed computing system as multiple generations;

identifying, by the microservice, one or more dependent objects for the target object using information received in the request;

generating, by the microservice, a new object that includes the data from the target object and the one or more dependent objects;

storing the new object in the distributed computing system; and deleting the target object from the distributed computing system.

16. The computer program product of claim 15, wherein the target object is stored in a storage attached network (SAN) in the distributed computing system, and wherein the microservice is executing within the SAN.

17. The computer program product of claim 15, wherein the information received in the request includes a first object name for the target object, a second target name for a dependent object, and grain IDs for each of the target object and the dependent object.

18. The computer program product of claim 17, wherein the method further comprises:

generating, by the microservice, and object mapping table for the target object, wherein the object mapping table includes disk addresses for the target object and for the dependent object at two or more locations in the distributed computing system.

19. The computer program product of claim 15, wherein the distributed computing system includes a plurality of storage servers, each storage server containing a copy of each generation of the object, wherein each respective server comprises a microservice configured to perform the receiving, identifying, generating, storing, and deleting operations on the copy of the object stored on the respective server.

* * * * *